(12) United States Patent
Uhl

(10) Patent No.: US 12,265,211 B2
(45) Date of Patent: Apr. 1, 2025

(54) MICROSCOPE DEVICE WITH VIRTUAL OBJECTIVE

(71) Applicant: Miltenyi Biotec B.V. & CO. KG, Bergisch Gladbach (DE)

(72) Inventor: Rainer Uhl, Munich (DE)

(73) Assignee: Miltenyi Biotec B.V. & CO. KG, Bergisch Gladbach (DE)

(*) Notice: Subject to any disclaimer, the term of this patent is extended or adjusted under 35 U.S.C. 154(b) by 610 days.

(21) Appl. No.: 17/267,886

(22) PCT Filed: Aug. 12, 2019

(86) PCT No.: PCT/EP2019/071589
§ 371 (c)(1),
(2) Date: Feb. 11, 2021

(87) PCT Pub. No.: WO2020/038754
PCT Pub. Date: Feb. 27, 2020

(65) Prior Publication Data
US 2021/0181489 A1    Jun. 17, 2021

(30) Foreign Application Priority Data
Aug. 20, 2018 (EP) .................... 18189762

(51) Int. Cl.
*G02B 21/00* (2006.01)
*G02B 21/36* (2006.01)

(52) U.S. Cl.
CPC ..... *G02B 21/0044* (2013.01); *G02B 21/0072* (2013.01); *G02B 21/0076* (2013.01); *G02B 21/365* (2013.01)

(58) Field of Classification Search
CPC ............ G02B 21/0044; G02B 21/0072; G02B 21/0076; G02B 21/365; G02B 21/0004;
(Continued)

(56) References Cited

U.S. PATENT DOCUMENTS

2016/0373663 A1* 12/2016 Ghetler .............. G01N 21/9508

OTHER PUBLICATIONS

Yanan Zhi et al., "Super-Resolution Scanning Laser Microscopy Based on Virtually Structured Detection", Critical Reviews in Bomedical Engineering, vol. 43, No. 4, 2015, pp. 297-322 (Year: 2015).*

* cited by examiner

*Primary Examiner* — Stephone B Allen
*Assistant Examiner* — Adam W Booher
(74) *Attorney, Agent, or Firm* — Jaquelin K. Spong

(57) ABSTRACT

There is provided a microscope device comprising: a microscope objective (18), a sample stage (12) for holding a sample (16) and moving the sample in a plane perpendicular to the optical axis of the microscope objective, a light source (20) and an illumination pattern generator unit (22) for illuminating the sample with a line-type illumination pattern, an area-detector detector (40, 44) for detecting light from the sample collected by the microscope objective, a scanning unit (24) for moving the illumination pattern in a scanning direction across the field of view, wherein the scanning direction is perpendicular to the longitudinal axis of the illumination pattern, and a control unit (42) configured to selectively operate the microscope arrangement in a normal magnification mode or in a lower magnification mode, wherein in the lower magnification mode the sample is moved in a direction antiparallel to the scanning direction while the illumination pattern is moved across the field of view by the scanning unit so as to obtain an at least unidirectionally compressed image, whereby the compression-factor is given by the ratio of the stage- and scan-speed.

11 Claims, 2 Drawing Sheets

(58) Field of Classification Search
CPC .............. G02B 21/002; G02B 21/0024; G02B 21/0032; G02B 21/0036; G02B 21/0048; G02B 21/0052; G02B 21/26; G02B 21/36; G02B 21/361; G02B 21/367
See application file for complete search history.

MICROSCOPE DEVICE WITH VIRTUAL OBJECTIVE

The invention relates to a microscope device.

Confocal microscope devices, which rely on a two-dimensional detector, usually employ a spatially filtered illumination pattern, generated, for example, by a physical mask, move the pattern across the field of view of the microscope by means of a scanning unit, and—to achieve depth-resolution—provide means for spatial filtering of the resulting emission pattern. Spatial filtering is achieved by a corresponding physical mask, or by an electronically generated mask on the detector. For instance, a slit-shaped illumination pattern may be recorded and confocally filtered by adjusting the rolling shutter slit-width of a given camera to the width of the slit-shaped emission pattern and by electronically synchronizing their respective movement.

A first such line confocal microscope device, using a rolling shutter camera, has been described in the article "*A line scanning confocal fluorescent microscope using a CMOS rolling shutter as an adjustable aperture*", by E. Mei et al., in "Journal of Microscopy", Volume 247, 2012, pages 269 to 276.

Another combination of a slit-shaped illumination pattern with a rolling shutter confocal mask has been described in US 2014/0313576 A1, where the slit-shaped illumination comprises structural modulations so as to record slit-confocally filtered phase-images which can be combined into 3D-SIM ("structured illumination microscopy") images.

In the article "*Image scanning microscopy*", by C. B. Müller et al., in Physical Review Letters 104, 198101 (2010) a confocal microscope device is described, wherein resolution is enhanced by a factor of 2 by using illumination with a single diffraction limited spot, and York et al. ("*Instant super-resolution imaging in live cells and embryos via analog image processing*" in Nature Methods. 2013 Nov.; 10(11): 1122-1126) have extended the method so as to work with more than one spot.

In classical microscopy, magnification and resolution are determined by the selected microscope objective. To address a plurality of different microscopy applications, microscope devices typically include a plurality of objectives which may be interchangeably positioned in the beam path. In cases where a camera is used as a detector, the given pixel size has an impact on the magnification to be selected, since only in case that the pixels correspond to the space frequencies resolved by the objective, the image recorded by the camera will match with the resolution defined by the numerical aperture ("NA") of the objective. For example, in order to yield a diffraction limited performance, a typical pixel size of 6.5 µm requires the use of a 60× rather than a 40× objective, although 40× objectives are available with the same NA and hence with the same resolution.

However, the need for the use of interchangeable objectives imposes certain restrictions on the mechanical structure of the microscope device, in particular, with regard to the vertical adjustment drive and the autofocus system, and also with regard to the adjustment of the pupil beam path (typically, the pupil position of different objectives is different; this is particularly important for microscope devices for which illumination of the pupil is crucial, such as when using structured illumination). Moreover, the need for interchanging objectives is cumbersome for all automated processes, such as thickness correction of the cover glass or automated application of an immersion liquid. Thus, the need for interchangeable objectives may have detrimental effects on the performance of the microscope device.

It is an object of the invention to provide for a microscope device which allows for flexible but nevertheless convenient operation.

This object is achieved by a microscope device as described herein.

The invention provides for a microscope device exhibiting a "virtual objective mode", which allows to obtain different actual magnifications with the same physical objective. Such virtual objectives may exhibit a lower (sub-magnification mode), or a higher magnification than the actual objective (super-magnification mode). Both modes preferably employ confocal spatial filtering and overcome the hardships of microscope designs using interchangeable objectives without sacrificing image quality. To the contrary, by using a single objective for all conceivable applications image quality may even be improved in many cases.

According to a first aspect of the invention as defined in claim 1, a line-type illumination pattern is moved by a scanning assembly in a scanning direction across the field of view—and thus across the sample—while the detector preferably acts as a rolling shutter camera wherein a corresponding strip-like activated zone moves synchronously across the detector in such way, so that the image of the illuminated part of the sample always remains within the activated zone of the detector. So far, this solution follows the procedure described in the above article by Mei et al., J. of Microscopy, 247, 2012, p. 269-276. However, according to the first aspect of the present invention, to obtain a demagnified detection, the sample is constantly moved relatively to the objective, and this movement occurs in a direction opposite to the scanning direction (and the corresponding rolling shutter direction in case that there is a rolling shutter). Thus a given sample portion passes through the slit-shaped illumination at a speed amounting to the sum of sample speed and scan speed. The resulting blur along the (collinear) scanning and movement axis is more than compensated by the desired virtual demagnification. Binning in the direction orthogonal to the scan-direction allows to match the magnification in both directions. Thus, adjusting the virtual magnification of the microscope objective in the direction of movement of the sample is achieved by controlling the velocity of the sample movement relative to the scanning velocity, while in orthogonal direction it may be achieved by binning an appropriate number of pixels. The scanning direction is perpendicular to the longitudinal axis of the illumination pattern.

For example, an n=3× demagnification requires the stage to move at (n−1)× the speed of the slit-pattern on the sample. Accordingly, one sweep covers in the scan-direction the length of three camera frames, in the orthogonal direction only one. To obtain the equivalent of 3×3 frames, one pattern-scan covers three times the camera-area, and such scans need to be repeated 3× altogether. A bidirectional (zig-zag) scan is favorable in order to speed up image acquisition maximally.

To obtain images from a larger area requires longer stretches to be measured in a single sweep, while the sample is continuously moving. To this end the light has to be turned off while the rolling shutter is reset from the last line of the chip to the first one again. It is turned on again and scan-assembly and rolling shutter resume their task when the part of sample that has been scanned before crosses the first detector-line again.

This first aspect of the invention, i.e. the de-magnifying virtual objective, eliminates the need for changing objectives between recording an overview of a given sample and obtaining high resolution images, and given that with the de-magnifying virtual objective an immersion fluid needed for the high resolution images at the end can be applied before starting a given protocol, protocol executions becomes smoother and more convenient. The time saved by avoiding the usual stop and go of a conventional sample mapping compensates for the extra-time incurred by having to record n times more image-traces in cases where a n-fold demagnification is requested.

When forgoing the preferred slit-confocality described above, one can replace the rolling shutter camera by other camera-types, which acquire image information from areas that are not illuminated at a given time. As already mentioned above, the only prerequisite is that the direction of the sample movement and the longitudinal axis of the illumination pattern (which corresponds to the orientation of the line of the pattern) are orthogonal to each other. While this waiving of confocality reduces image quality to the level of a widefield image, it is less challenging with respect to maintaining the right focus-position during sample-movement.

It should also be noted that a slit-shaped illumination pattern, as generated from the side by means of a so-called light-sheet mode, for instance by using a second objective (typically at an angle of about 90° with regard to the optical axis of the microscope), can replace the slit-illumination of the above virtual objective scheme and thus acquire light-sheet-images from a continuously moving sample, too. Again sample and scan have to move along a common axis orthogonally oriented to the longitudinal axis of the illumination pattern.

A second aspect of the invention relates to a microscope device enabling a virtual "super-magnification mode". Such virtual super-magnification mode requires a different camera read-out scheme. Instead of having a continuously moving active window, synchronized with the continuous movement of the illumination pattern over the sample, image frames are composed from a plurality of "subarray-snapshots", whereby each such snapshot comprises as many pixel-rows as are needed to accommodate a line-shaped illumination/emission pattern completely. Between snapshots the illumination-pattern moves, and in order to always keep the pattern within the active window, the latter is incrementally shifted. The analysis of the pattern-snapshots is greatly facilitated because each snapshot includes much more information on the surroundings of the pattern-maxima than what a corresponding confocal aperture would allow to pass. From the measured intensity profiles, the known pointspread function of the pattern-spots and the known scan-speed, deconvolution algorithms rest on a much more solid basis than with a classical confocal microscope.

In a slow variant, the scan-movement is also carried out in steps, whereas a fast variant employs a continuous scan-movement, whereby movement-dependent blur is avoided by a stroboscopic illumination, or the blur-impact is minimized by deconvolution of the predictable movement artifact. This is facilitated by precisely knowing the relative speed of sample and illumination-pattern movement on one hand, and the pointspread-function of the illumination pattern on the other.

While the above "snapshot mode" can—in principle—be used for virtual demagnification, too, it is particularly useful for implementing a "super-magnification mode", in which the virtual magnification may be increased up to 2× compared to the real magnification by using an illumination pattern comprising diffraction limited spots arranged along a line and by recording a matching slit-shaped area on the detector chip, i.e. a pixel-subset which always contains the image of the pattern. While an illumination pattern of this type as such is known, e.g. from US 2014/0313576 A1, in which example the pattern is generated by stationary mask and a moving slit-shaped illumination field,—in the present "super-magnification mode" the actual illumination pattern is moved across the sample and the plurality of snapshots dissects the interaction of the pattern with the sample into discrete, deconvolvable images.

After completing a scan of the scanning unit, generating a first plurality of partial images wide enough to always contain the pattern image, whereby the position of the starting pixel row of each partial image is incremented in synchronism with the movement of the image of the illumination pattern on the detector, only a fraction of the sample has seen the illuminating pattern. In order to obtain a full image, the remaining gaps after a single sweep have to be filled. To this end the pattern has to be shifted at an angle relative to the scan direction and the scan-process has to be repeated. How many such repetitions are needed depends on the gap-width of the pattern. Wider gaps mean better distinguished individual spots, thus facilitating their deconvolution, but they also mean more snapshots for a single sweep and more sweeps in order to fill the gaps.

In order to achieve the desired magnification-increase with concomitant increase in resolution, the isolated deconvolved spot-images (deconvolution is based on the known pointspread-function of the spots and the information concerning the movement of the illumination pattern (and movement of the sample, if any)) are contracted by a factor of two, meaning that the pixelated images of the illuminated spots are reduced in size by a factor of two and are positioned such, that the maximum remains at the position where it used to be. This procedure, in essence, follows the method described in "*Image scanning microscopy*", by C. B. Müller et al., in Physical Review Letters 104, 198101 (2010), but in the present case it is employed to a plurality of spot-images simultaneously. However, the resulting super-magnification widens the gap between the pattern-spots (by a factor of two) and hence the sampling frequency has to be increased 2×2=4×. Thus, an image is only completed when, in such manner, the entire field of view (and thus the respective sample surface area) has been more or less homogenously covered by deconvolved emission spots.

Actually, in the super-magnification mode, the diffraction limited spots are moved across the sample surface in parallel adjacent lanes.

In the super-magnification mode, the achieved actual magnification may be up to 2 times larger than the magnification of the microscope objective in the normal magnification mode, and also the resolution can be increased by a factor of up to 2.

Forgoing super-magnification, the microscope device may also be operated in a normal magnification mode, in which the illumination pattern does not consist of diffraction limited spots but rather is line-shaped.

Preferred embodiments of the invention are defined in the dependent claims.

Hereinafter, examples of the invention will be illustrated by reference to the attached drawings, wherein.

Figure 1:
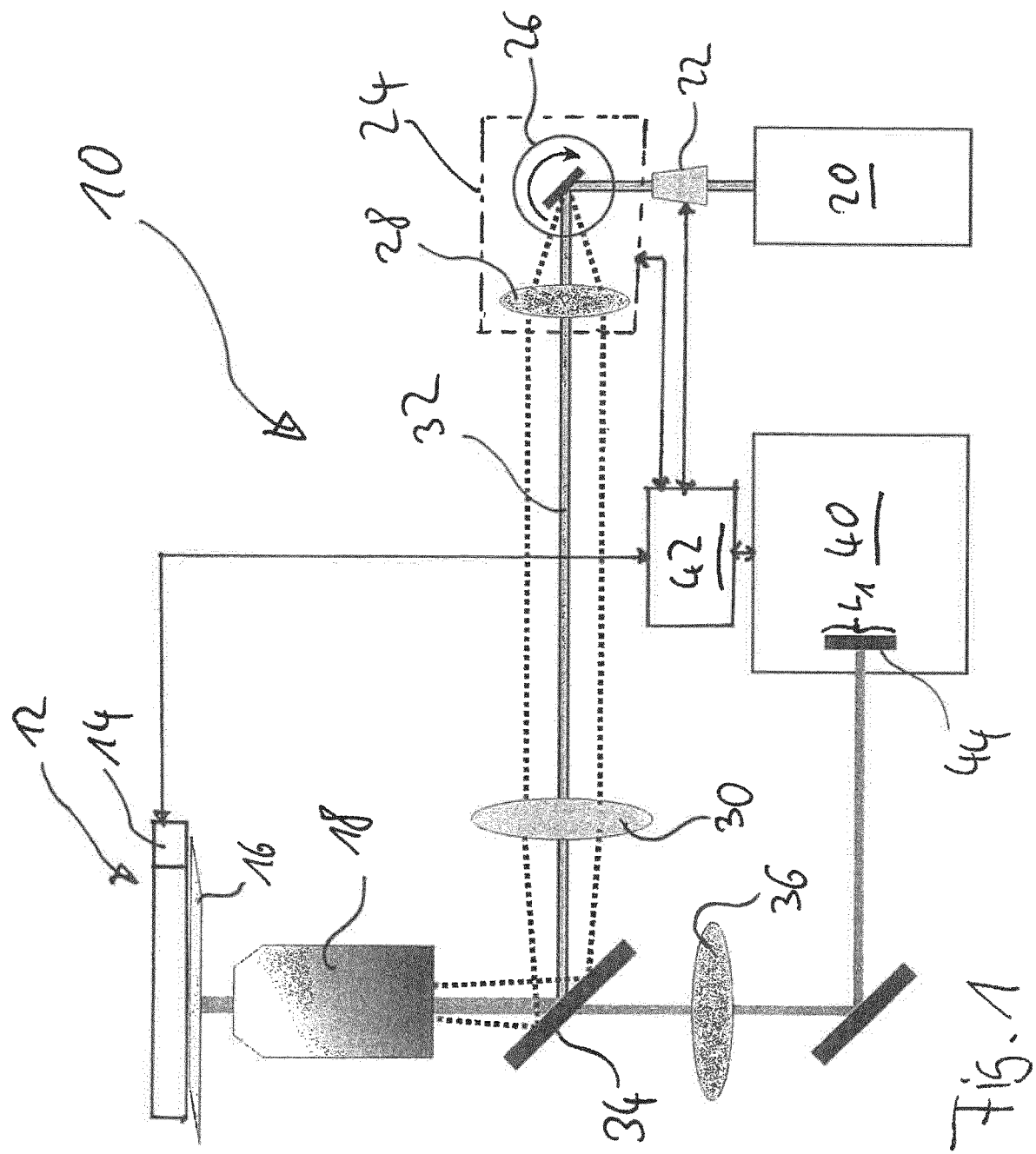
FIG. 1 is a schematic view of an example of a microscope device according to the invention.

FIG. 1 illustrates an example of a confocal microscope device 10 allowing variable magnification without the need for more than one microscope objective. The microscope device 10 comprises a moveable sample holder or stage 12 including a drive unit 14 for moving a sample 16 at least in a plane perpendicular to the optical axis of a microscope objective 18 and a light source 20, such as a laser, for providing for illumination light, which is filtered in a pattern generator 22 to generate an illumination pattern. The microscope device 10 further comprises a scanning unit 24, which includes a (in a preferable embodiment galvanometrically driven) deflection mirror 26 and a scan lens 28 for generating an infinity space, and a first tube lens 30 for collimating the illumination light beam 32 which is directed onto the pupil of the microscope objective 18 via a dichroic beam splitter 34 so as to illuminate the sample 18 with the illumination pattern. The light emitted by the illuminated part of the sample 16 (which typically is fluorescent light) is collected by the microscope objective 18 and passes through the dichroic beam splitter 34 (which in the example of FIG. 1 is a long-path) onto a second tube lens 36 which collimates the image beam 38 for generating an image of the illuminated sample surface on a camera detector 40.

The microscope device 10 further comprises a control unit 42 for controlling the sample holder drive unit 14, the scanning unit 24, the detector 40 and the pattern generator 22.

As will be explained in more detail, the detector 40 is provided with a rolling shutter functionality so as to allow, in conformity with the selected illumination pattern, for confocal measurements.

The microscope device is implemented in such a manner that a single physical microscope objective may be used as a "virtual objective" having a reduced magnification or even having an increased magnification, compared to a "normal" operation of the microscope device. The physical objective 18 is selected according to the desired maximal resolution, while the microscope device may be operated in a lower magnification mode or a higher magnification mode, in which modes the physical objective 18 behaves as if it were an objective having a lower or higher magnification at least in one dimension.

For example, prior to performing a detailed fluorescence measurement of a sample, it may be desirable to first record an overview image of the sample to be able to identify potentially interesting regions of the sample, which then may be examined in detail with higher resolution. In particular, it is desirable to be able to switch in short time from such overview mode of the microscope device to a mode with higher resolution without the need to newly focus the objective and without the need for repeated application of immersion liquid between overview and high-resolution mode.

For example, it may be desired to map a sample region of 11×11 mm by using a 4 megapixel camera having a pixel size of 6.5 µm and to then characterize selected sub-regions with high resolution. For the high resolution images a 60× magnification may be selected in conformity with Shannon's sampling theorem. However, for an overview image a magnification would be sufficient which is six times lower, so that typically a 10× objective would be used to this end. In order to realize a virtual 10× objective by a physical 60× objective, one would have to record 50×50=2500 single frames and to then bin 6×6 pixel each. Even with fastest stop-and-go operation this would take more than 10 minutes, during which time the operator could not work before he can select the sub-regions to be examined in more detail. An operator using a classical eyepiece microscope would randomly inspect the specimen by using a 10× objective and then, once he has found an interesting region, would switch there to the 60× magnification by interchanging the 10× objective with a 60× objective. This is a cumbersome process in case that the high resolution objective is an immersion objective, in particular, if several random samples require several objective changes.

The proposed solution uses movement of an "illumination slit" (i.e., a line-type illumination patter) relative to the sample, with the illumination slit having a length corresponding to the respective dimension of the camera chip; such relative movement occurs continuously without stops, and the resulting emission image likewise is recorded continuously. In this way, first a single lane (which in the above example may have a length of 11 mm and a width of 220 µm) is recorded, and then adjacent lanes are recorded one by one. Each image pixel of the overview image then consists of a number of initial high resolution pixels which have been compressed in both dimensions according to the desired virtual magnification.

A virtual objective having a reduced magnification can be realized by providing for (1) continuous movement of the specimen relative to the microscope device, (2) slit-like illumination of the specimen through the objective, with the illumination pattern likewise moving relative to the microscope objective in a direction opposed to the movement of the specimen—and, to obtain slitscan confocality—(3) a rolling shutter camera having a "slotted shutter", which moves in synchronism with the illumination slit. By using a relatively short exposure time, the rolling shutter slit can be made very narrow and can be adjusted to the width of the illumination slit, whereby slit confocal detection is enabled. The opposite movement directions of the sample and the slit result in a lower blurring compared to a case in which the slit is stationary.

Figure 2:
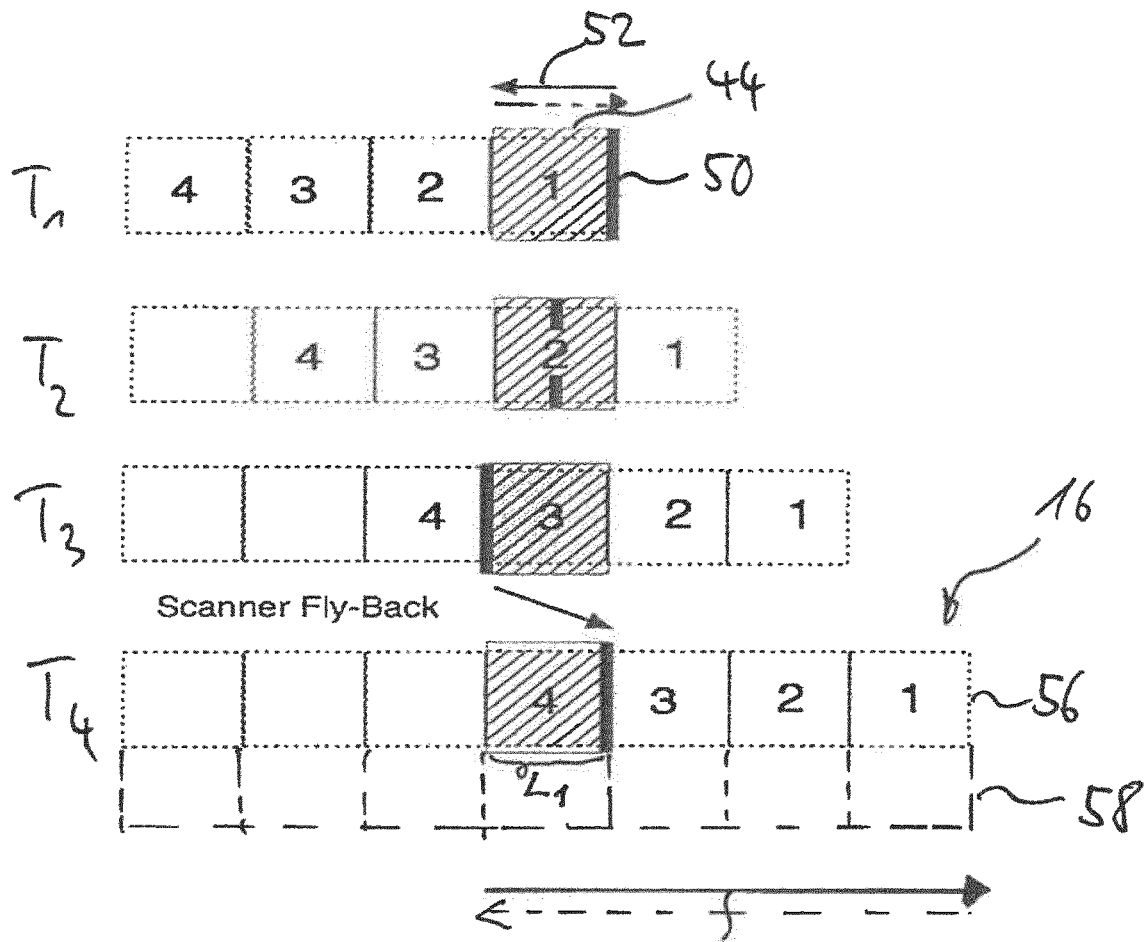
FIG. 2 is an illustration of the sample movement and the scanning movement when operating a microscope device in a lower magnification mode.

The above principle will be illustrated hereinafter by reference to a virtual 20× objective, wherein the sample is moved continuously relative to the objective and the camera detector and wherein the illumination slit is moved relative to the objective by the scanning unit at half of the velocity of the sample movement. FIG. 2 illustrates such movement of an illumination slit (i.e., an illumination line) 50 across the sample 16 and across the chip 44 of the detector camera 40 and the movement of the sample 16 relative to the microscope device and hence relative to the camera chip 44. The movement direction of the illumination slit 50 is indicated by an arrow 52, and the direction of movement of the sample is indicated by an arrow 54; the numbers "1, 2, 3, 4" designate different regions of the sample 16.

As can be seen in FIG. 2 at times $T_1$, $T_2$ and $T_3$, when the illumination slit 50 has moved once across the length $L_1$ and reaches the end of the camera chip 44, the illumination slit 50 has moved across—and hence has illuminated—three sample sectors/regions, namely sectors 1, 2 and 3, while the sample has moved relative to the detector chip 44 only by two sample sectors (the sample sectors indicated in FIG. 2 equal the area of the detector chip 44). In other words, while the illumination slit 50 has moved by three chip lengths $L_1$ across the sample 16, the sample has only moved by two chip lengths $L_1$ relative to the detector chip 44.

Now, at time $T_3$, the illumination light is turned-off and the illumination slit 50 is moved back to its starting point (relative to the detector chip 44) during this dark phase by the scanning unit 24. Thereafter, at time $T_4$, the illumination light is turned-on again and the scanning action is started again, as soon as the already scanned left edge of the sample sector 3 has passed the illumination slit position. This procedure is repeated until the desired length of the first image lane 56 has been recorded.

Thereafter, an adjacent lane 58 is recorded, wherein, however, preferably all movement directions (namely sample movement, rolling shutter movement and illumination slit scanning movement) are reversed so as to save time. In the example, wherein an area of 11×11 mm is to be recorded, 50 lanes would have to be recorded, and the resulting images would have to be combined in a mosaic-type manner, so as to record the entire area. In the example shown in FIG. 2, each (partial) image would cover three sample sectors (corresponding to three chip areas). Assuming a realistic sample stage velocity of 22 mm/s, the mere scanning time without turnaround times would be 50×0.5 s=25 s. Even with generously assumed turnaround times (which primarily consist of the braking phases and the subsequent acceleration phases), this method pronounces an acceleration of the scanning procedure by a factor of more than 10 relative to stop-and-go recording using a 10× objective.

The resolution of such a virtual 20× objective corresponds in the direction perpendicular to the scanning direction 52 to the resolution of a real (physical) 60× objective; however, by 3-fold binning the pixel resolution may be adjusted to the desired virtual magnification. It is noted that a stage which does not move perfectly straight may generate distortions which, however, are not significant in the relevant space frequency region.

While in the above method the magnification of the virtual objective is determined by a factor corresponding to over how many chip length $L_1$ the illumination slit 50 moves across the sample while it moves once across the chip, the factor of the reduction of the resolution is determined by the number of chip lengths $L_1$ the sample moves with regard to the chip 44 while the illumination slit 50 moves once across the chip 44. These considerations, of course, only apply to the scanning direction 52/sample movement direction 54. Thus, in the present example, the magnification of the virtual objective corresponds to that of a 20× objective, while the resolution of the virtual objective corresponds to that of a 30× objective, which has about half the resolution of a physical 60× objective.

According to another example, the method may be adjusted without loss of velocity—provided that the camera velocity and the stage accuracy are high enough—in such a manner that a virtual 20× objective has the resolution of a physical 40× objective. To this end, the stage and the scanning unit may be moved at the same velocity in opposite directions, with the dark phases amounting to 50% of the total movement time.

The above method may be implemented, for example, by using a rolling shutter camera, wherein the active window moves continuously across the chip; once the active window reaches the end of the chip, all lines of the chip are read out. It works with other camera-types, too, but it then forfeits slit-confocality and provides the image-quality of a wide-field microscope.

According to an alternative embodiment, a camera may be used which is able to compose images from a plurality of partial images which overlap and which are moved from one partial image to the next partial image only by a fraction of the width of the partial image. For example, the first partial image may be recorded from rows 1 to 10 of the chip, and the second partial image may be recorded from rows 2 to 11, etc., with an increment of one pixel row from one partial image to the next. By using such camera, the movement of a slit-type illumination pattern across a moving specimen may be tracked by incrementing the presently active pixel rows in synchronism with the movement of the slit in such a manner that the image of the slit on the sample—which is blurred by the movement of the image of the sample on the chip—remains always in the center of the active window. The resulting partial images may be deconvolved in the scanning direction by using the known relative movement of the stage (which moves the sample) and the scanning unit (which moves the illumination slit), and then the deconvolved images may be combined to achieve the final total image.

It is to be noted that, when using a physical high magnification objective for fast recording of fluorescent overview images by implementing a virtual objective having a lower magnification, the depth of focus of the high magnification objective used will be much lower than that of the conventionally used low magnification objective (such as a 10× objective). Therefore, in order to enjoy the benefits of the virtual objective, a constant focus position of the sample should be ensured by using a very fast reacting focus-hold system, and the specimen for which the overview is to be obtained should be located in the adjusted focal plane.

According to another aspect, the microscope device shown in FIG. 1 may be used for implementing a virtual objective having a higher magnification than the physical objective 18; such higher magnification (or "super-magnification") virtual objective also may have a higher resolution than the physical objective 18. To this end, a linear row of diffraction limited spots may be generated by the pattern generator 22 so to form the illumination pattern (rather than a generating a line-type/slit-like pattern as in the examples above); illumination pattern is illustrated in the upper part of FIG. 3 wherein two spots 60 are shown on the detector 16. The illumination pattern is moved by the scanning unit 24 across the field of view—and thus across the sample 16—while an active pixel window on the chip 44 is moved in synchronism continuously from one end of the chip 44 to the other end, like in the previous examples.

Thereby a number N of partial images is obtained, which represent snapshots of the illumination pattern on the sample and which are blurred in the scanning direction to an extent which can be adjusted via the scanning velocity to the resolution needs. Since for each registered illumination spot the exact position of the spot and the positions of the surrounding illumination nulls are known, deconvolution of the images can occur in a very purposeful manner and the impact of adjacent illumination spots, which are located perpendicular to the scanning direction, can be eliminated.

However, since the illumination pattern—in contrast to the previously discussed slit-type pattern, has "voids" (or "gaps") between the spots, it is necessary to "fill" these voids by repeating the scanning action with different lateral positions of the illumination pattern, i.e., the illumination pattern is repeatedly shifted in the direction perpendicular to the scanning direction by a certain fraction of the distance between two adjacent illumination spots so often that the "voids" between adjacent spots in the row can be closed. This requires M repetitions of the scanning procedure, with M being determined by the desired resolution and by the requirement that all gaps have to be filled and that all points of the sample should have "seen" the same amount of light. In the end, the N×M snapshots (partial images) can be combined to obtain a single final image by using the knowledge concerning the respective recording position of each partial image.

Figure 3:
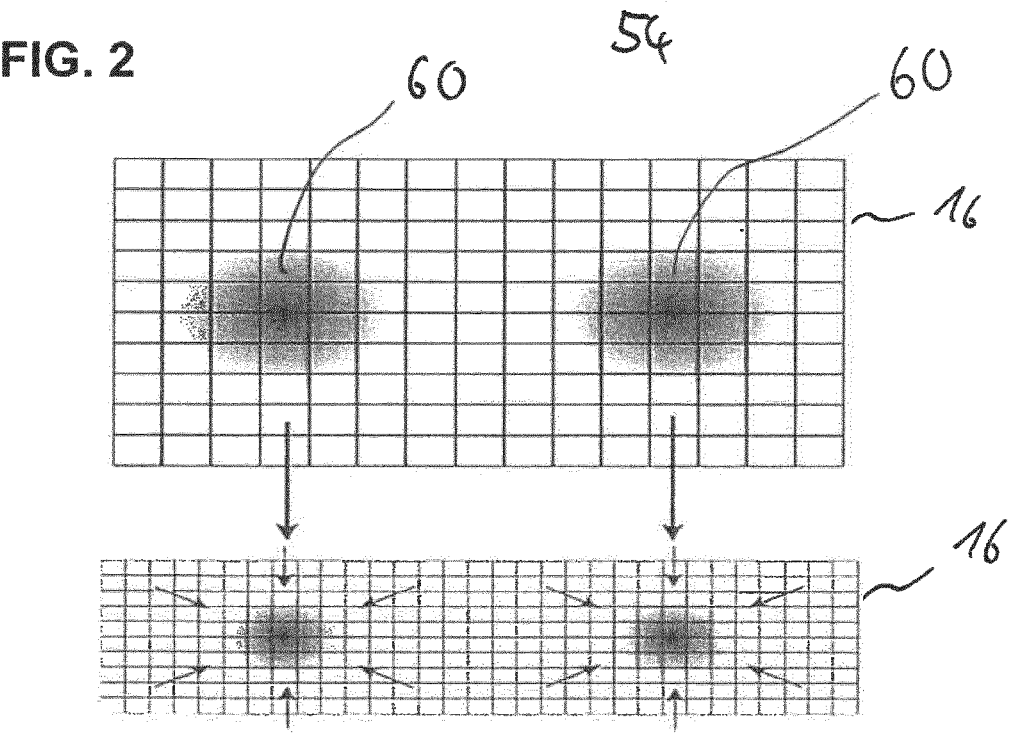
FIG. 3 is a schematic illustration of an image of an illumination pattern using diffraction limited spots when operating a microscope device in a high magnification mode.

Finally, the spots resulting from the deconvolution can be compressed around their center by a factor of 2 (as illustrated in the lower part of FIG. 3). In case of a sufficiently close sampling, i.e., in case that in the scanning direction and in the direction perpendicular thereto a sufficient number of image points/illumination spots is recorded so that the combined image does not comprise gaps/voids, a horizontal resolution can be obtained which is higher by a factor of root (2) compared to a conventional image. Thus, an image recorded with a physical 60× objective having an NA of 1.28 corresponds to an image recorded with a virtual 120× objective having an NA of 1.8.

The invention claimed is:

1. A microscope device comprising:
a microscope objective (18),
a sample stage (12) for holding a sample (16) and moving the sample in a plane perpendicular to the optical axis of the microscope objective,
a light source (20) and an illumination pattern generator unit (22) for illuminating the sample with a line-type illumination pattern,
an area-detector detector (40, 44) for detecting light from the sample collected by the microscope objective,
a scanning unit (24) for moving the illumination pattern in a scanning direction across the field of view, wherein the scanning direction is perpendicular to the longitudinal axis of the illumination pattern, and
a control unit (42) configured to selectively operate the microscope arrangement in a normal magnification mode or in a lower magnification mode, wherein in the lower magnification mode the sample is moved in a direction antiparallel to the scanning direction while the illumination pattern is moved across the field of view by the scanning unit so as to obtain an at least unidirectionally compressed image, whereby the compression-factor is given by the ratio of the stage- and scan-speed.

2. The microscope device of claim 1, wherein in the normal magnification mode the sample (16) is kept stationary or is moved in the direction antiparallel to the scanning direction at a lower velocity than in the lower magnification mode.

3. The microscope device of claim 1, wherein the scanning unit (24) is controlled such that, when the image of the illuminated line on the detector reaches an end of the length of the detector (44), illumination of the sample (16) by the illumination pattern is interrupted while the illumination pattern is moved back to the starting position of the movement across the field of view at the other end of the length of the detector so as to complete one scanning cycle.

4. The microscope device of claim 3, wherein the scanning cycle is repeated while the sample is moved until the entire desired sample surface has been covered once by the illumination pattern, wherein a sub-image of the sample surface is created in each scanning cycle, and wherein the at least unidirectionally compressed image is generated by combining the sub-images.

5. The microscope device of claim 4, wherein the sample (16) is moved in such a manner that the illumination pattern moves across the sample surface in parallel adjacent lanes (56, 58), and wherein for adjacent lanes (56, 58) preferably the scanning direction (52) and the movement direction (54) of the sample (16) both are inverted.

6. The microscope device of claim 1, wherein in the at least unidirectionally compressed image in the lateral direction perpendicular to the scanning direction pixel binning by a factor corresponding to the reduction of resolution in the scanning direction caused by the sample movement is applied to obtain a bi-directionally compressed image, and wherein the binning factor preferably is the inverse of: the distance the image of a sample point moves on the detector during one scanning cycle, divided by the length of the detector, minus one.

7. The microscope device of claim 1, wherein the detector (40, 44) is a rolling shutter camera controlled by the control unit (42) in such a manner that at a time only a strip-like zone of the detector is activated to detect light, with the activated zone being moved across the detector in synchronism with the movement of the image of the illumination pattern on the detector so as to implement a slit confocal illumination in which the image of the illuminated part of the sample (16) falls within the activated zone of the detector.

8. The microscope device claim 7, wherein the movement of the activated zone across the detector (40, 44) is implemented by continuous recording within the activated zone while the active zone moves across a detector chip (44), with the detector chip being read-out once the active zone reaches the end of the detector chip, and wherein the width of the activated zone preferably is the width of the image of the illuminated line on the detector plus less than 6 pixel rows.

9. The microscope device of claim 7, wherein the movement of the activated zone across the detector (40, 44) is implemented by recording a plurality of partial images of a width of X pixel rows, wherein the position of the starting pixel row is incremented in synchronism with the movement of the image of the illumination pattern on the detector so that the image of the illuminated line is located within the partial image, with the width of each partial image being larger than the width of the image of the illumination line on the detector, and wherein the partial images are deconvoluted according to the known motion of the sample and the illumination pattern prior to being combined.

10. The microscope device of claim 1, wherein the detector (40, 44) is a sCMOS camera having a pixel size of preferably less than 10 μm and preferably comprising at least 1 Megapixel.

11. The microscope device of claim 1, wherein the microscope arrangement (10) is for luminescence excitation and a comprises a dichroic beamsplitter (34) for separating the illumination light and the excitation light to be detected, and wherein the light collected by the microscope objective (18) is imaged onto the detector (40, 44) preferably by a tube lens (36).

* * * * *